United States Patent [19]
Gridley

[11] Patent Number: 5,552,774
[45] Date of Patent: Sep. 3, 1996

[54] MAGNETICALLY ACTIVATED FLOAT SWITCH

[76] Inventor: R. F. Gridley, 17353 Castile Rd., Fort Myers, Fla. 33912

[21] Appl. No.: 258,504

[22] Filed: Jun. 10, 1994

[51] Int. Cl.⁶ .................................................. G08B 21/00
[52] U.S. Cl. ........................ 340/623; 340/624; 73/296; 73/317; 73/318; 73/322.5
[58] Field of Search .................................. 340/623, 624; 73/296, 317, 318, 322.5; 200/61.2, 84 C, 84 R

[56] References Cited

U.S. PATENT DOCUMENTS

| 3,659,064 | 4/1972 | Inoue | 200/84 C |
|---|---|---|---|
| 3,746,035 | 7/1973 | Singer | 137/416 |
| 3,823,328 | 7/1974 | Barton et al. | 307/118 |
| 3,826,139 | 7/1974 | Bachman | 73/311 |
| 4,020,481 | 4/1977 | Nakagama | 340/624 |

Primary Examiner—John K. Peng
Assistant Examiner—Julie B. Lieu
Attorney, Agent, or Firm—William E. Noonan

[57] ABSTRACT

A magnetically activated float switch apparatus is disclosed for opening and closing an electrical circuit in response to a predetermined change in the level of a liquid. The apparatus includes a float element having an interior chamber. There is a capsule mounted within the chamber. A permanent magnet is mounted in the capsule and is slidable between first and second positions therein. A switch is mounted in the chamber adjacent to the capsule and is electrically connected to the electrical circuit. The switch is responsive to the permanent magnet in the first position for maintaining a first state and is responsive to a permanent magnet in the second position for maintaining an opposite second state. One of the states is open and the other is closed. The float element is suspended by a cable in an upright condition when the liquid is below a known level such that the magnet is in the first position and the switch is in the first state. A weight is attached to the float element for causing the float element to tip in the liquid when the liquid is at or above the known level such that the magnet shifts from the first position to the second position and the switch switches to the second state.

17 Claims, 3 Drawing Sheets

U.S. Patent
Sep. 3, 1996
Sheet 1 of 3
5,552,774
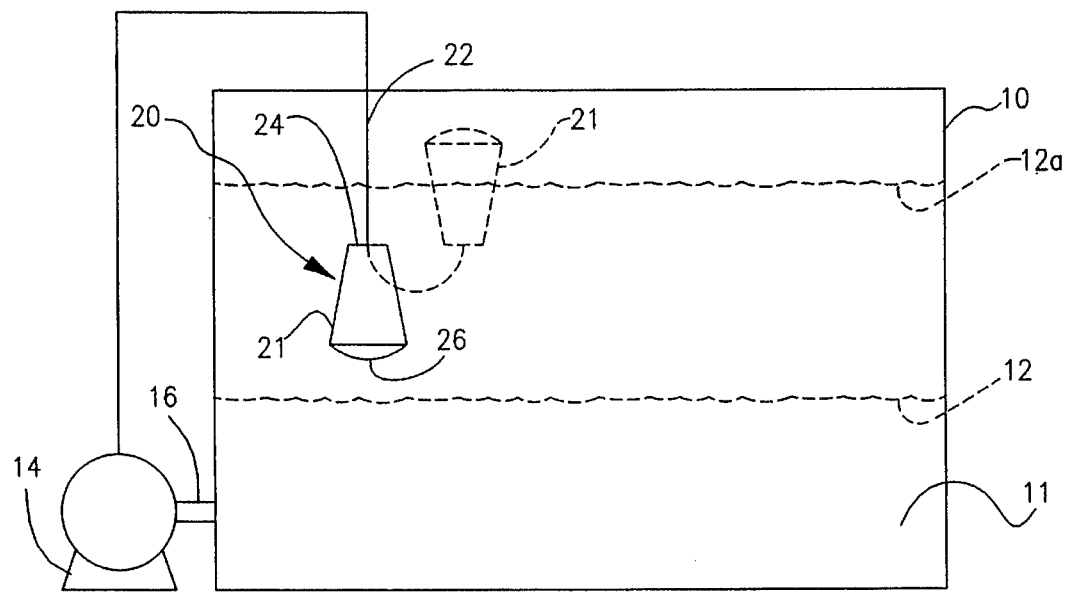
FIG. 1
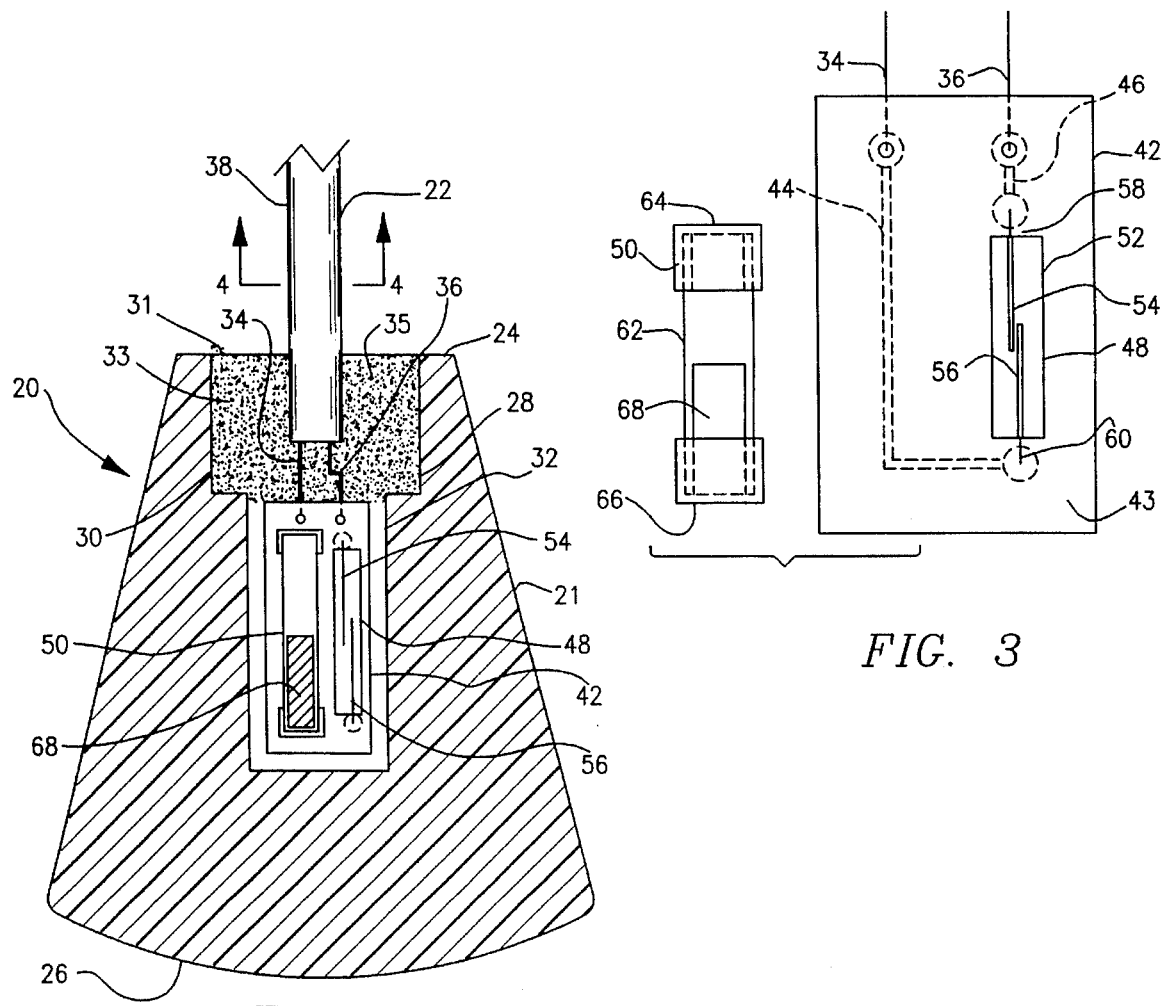
FIG. 2
FIG. 3

MAGNETICALLY ACTIVATED FLOAT SWITCH

FIELD OF THE INVENTION

This invention relates to a magnetically activated float switch and, in particular, to a switch for operating an electrically powered device, such as a pump, when a volume of water or other liquid rises above or drops below a predetermined level.

BACKGROUND OF THE INVENTION

Water tanks and other types of containers for holding liquids often must be monitored to ensure that a proper liquid level is maintained. If the liquid level rises too much, the tank or other container may overflow. Alternatively, if liquid level drops too low, the tank can run dry. Accordingly, it may be desirable to employ a pump to add liquid if the level drops too low or to remove liquid if the level becomes too high. Various types of audio and visual warning circuits may also be employed to report that a liquid level in a container is not within desired parameters.

Traditionally, in water pumping stations, mercury switches have been used to activate and deactivate a pump so that water level in a storage tank is controlled. Recently, however, the danger of mercury contamination and environmental damage has prompted a move to eliminate and replace these switches. As a result, the use of single station horizontal and vertical reed switches have become increasingly popular. Typically, these devices employ permanent magnets to operate a reed switch. More particularly, the reed switch is mounted in a permanent fixture and the magnet is mounted on either a cylindrical float (the vertical switch) or a pivoting float (the horizontal switch). Unfortunately, in many water storage tanks lime, slurry, grease or other contaminants tend to build up and interfere with the operation of the float. As a result, the switch may be rendered inoperable.

SUMMARY OF INVENTION

It is therefore, an object of the present invention to provide a magnetically activated float switch, which serves to effectively control a pump so that a predetermined liquid level is maintained.

It is a further object of this invention to provide a float switch that eliminates the intricate mechanisms and movable parts of existing float switches so that mechanical operation is facilitated and switch failures are reduced.

It is a further object of this invention to provide a magnetically activated float switch that avoids the build up of lime, slurry, grease, and other contaminants that may be found in a liquid storage tank.

It is a further object of this invention to provide a magnetically activated float switch that utilizes improved encapsulation for the magnet so that more reliable switching operation is achieved.

It is a further object of this invention to provide a magnetically activated float switch that may be used to operate a wide variety of devices including valves, lamps, warning systems and pumps.

It is a further object of this invention to provide a float switch that may be used equally effectively for monitoring, excess or insufficient liquid levels.

This invention relates to a magnetically activated float switch apparatus for opening and closing an electrical circuit in response to a predetermined change in the level of a liquid. The apparatus includes a float element having an interior chamber. There is a capsule mounted within the chamber. A permanent magnet is mounted in the capsule and is slidable between first and second positions therein. Switching means are mounted in the chamber adjacent to the capsule and are electrically connected to the electrical circuit. The switching means are responsive to the permanent magnet in the first position for maintaining a first state and are responsive to the permanent magnet in the second position for maintaining, an opposite second state. One of the first and second states is opened and the other is closed. There are suspension means attached to the float element for holding the float element upright when the liquid is below a known level such that the magnet is in the first position and the switching means are in the first state. Weight means are attached to the float element for causing the float element to tip in the liquid when the liquid is at or above the known level such that the magnet shifts from the first position to the second position and the switching means switch to the second state.

In a preferred embodiment, the float element has a truncated, generally conical shape. The float element may include a convex lower surface. The chamber may extend inwardly from the truncated end of the float element.

Preferably, the capsule includes a first elongate tubular element. The switching means may be enclosed by a second elongate tubular element that is adjacent and generally parallel to the first tubular element. The tubular elements may be mounted on a printed circuit board that defines a portion of the electrical circuit and includes circuitry that is electrically connected to the switching means. Typically, the switching means include a magnetically activated reed switch.

The suspension means may include electrical cable means which carry at least a portion of the electrical circuit. The cable means may comprise an outer cable jacket that is joined to the float element, electrical wiring, that extends through the jacket and is connected to the switching means and filler means extending through the jacket and formed around the wiring.

The float element may include a recess proximate an upper end of the float element for receiving the weight means. The weight means may include a weighted filler and a binding element for encapsulating a lower end of the cable and the filler in the recess. Typically, the recess is adjacent to the chamber and the circuit extends into the chamber and is connected to the switching means. The recess is preferably formed in the truncated end of the generally conical shaped float element.

In an alternative preferred embodiment, the chamber includes a cylindrical portion and an adjoining, generally conical portion. The weight means may include a cylindrical element that is received in a close tolerance fit within the cylindrical portion. The cylindrical element may include an axial bore that receives the permanent magnet capsule and the switching means. The permanent magnet capsule and the switching means may be encased in an epoxy-like substance within the bore.

DETAILED DESCRIPTION OF PREFERRED EMBODIMENTS

Other objects, features and advantages will occur from the following description of preferred embodiments and the accompanying drawings, in which:

FIG. 1 is a simplified elevational, partly schematic view of a liquid storage tank that employs the magnetically activated float switch of this invention;

FIG. 2 is an elevational, cross sectional view of the float element and the switch mechanism contained therein;

FIG. 3 is a plan view, partially exploded, of the reed switch and encapsulated permanent magnet, as well as the printed circuit boat on which those components are mounted;

Figure 4:
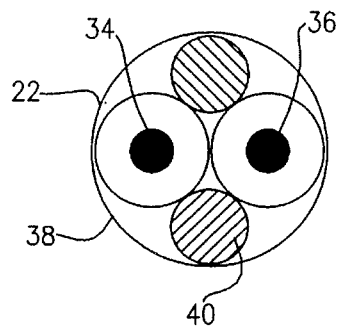
FIG. 4 is a cross sectional view of the cable taken along line 4—4 of FIG. 2.

There is shown in FIG. 1 a vessel or container 10 for holding a liquid 11. The liquid may comprise water or various other forms of liquid. Container 10 may be a water storage tank, a vat, a reservoir or other holder for liquid 11. During the course of normal use the level of the liquid may rise and lower in container 10. In FIG. 1 level 12 represents a shallower level and level 12a, in phantom, designates a deeper level. A conventional pump 14 is communicably attached to container 10 by appropriate duct work 16. Pump 14 serves to remove liquid from or add liquid to container 10 as required. This pumping operation is performed in a known manner.

A float switch apparatus 20, according to this invention, is suspended within container 10. Apparatus 20 includes a float element 21 that is hung within the container by a cable 22. The cable accommodates an electrical circuit that electrically interconnects apparatus 20 with pump 14. Cable 22 is mounted above container 1 by various known types of brackets or holders. The specific type of holder is not critical. All that is required is that float element 21 be suspended from cable 22 generally in the manner shown in FIG. 1. In certain embodiments, cable 22 may simply be draped over the upper edge of container 10 such that float element 21 is suspended within the container.

The float element has a generally truncated, conical shape. In particular, it includes an upper truncated end 24 and a lower convex end 26. Cable 22 is secured to truncated end 24 in a manner described more fully below. As also will be described below, float element 21 includes a buoyant material. Weight means are secured to the float element proximate truncated end 24. As a result, when liquid rises to the level 12a, float element 21 tips and inverts to the position shown in phantom. This causes the operation of the switch as is detailed below.

As more specifically illustrated in FIG. 2, float element 21 is composed of a buoyant material, such as foam, PVC or other types of low density plastic or synthetic materials. An internal cavity 28 is formed in the float element. Cavity 28 extends inwardly from truncated end 24 toward convex end 26. The cavity includes a relatively large recess portion 30 and a relatively narrow but elongated portion 32. As discussed further below, the float element may be designed to exhibit either a positive or negative buoyancy after operation.

Figure 5:
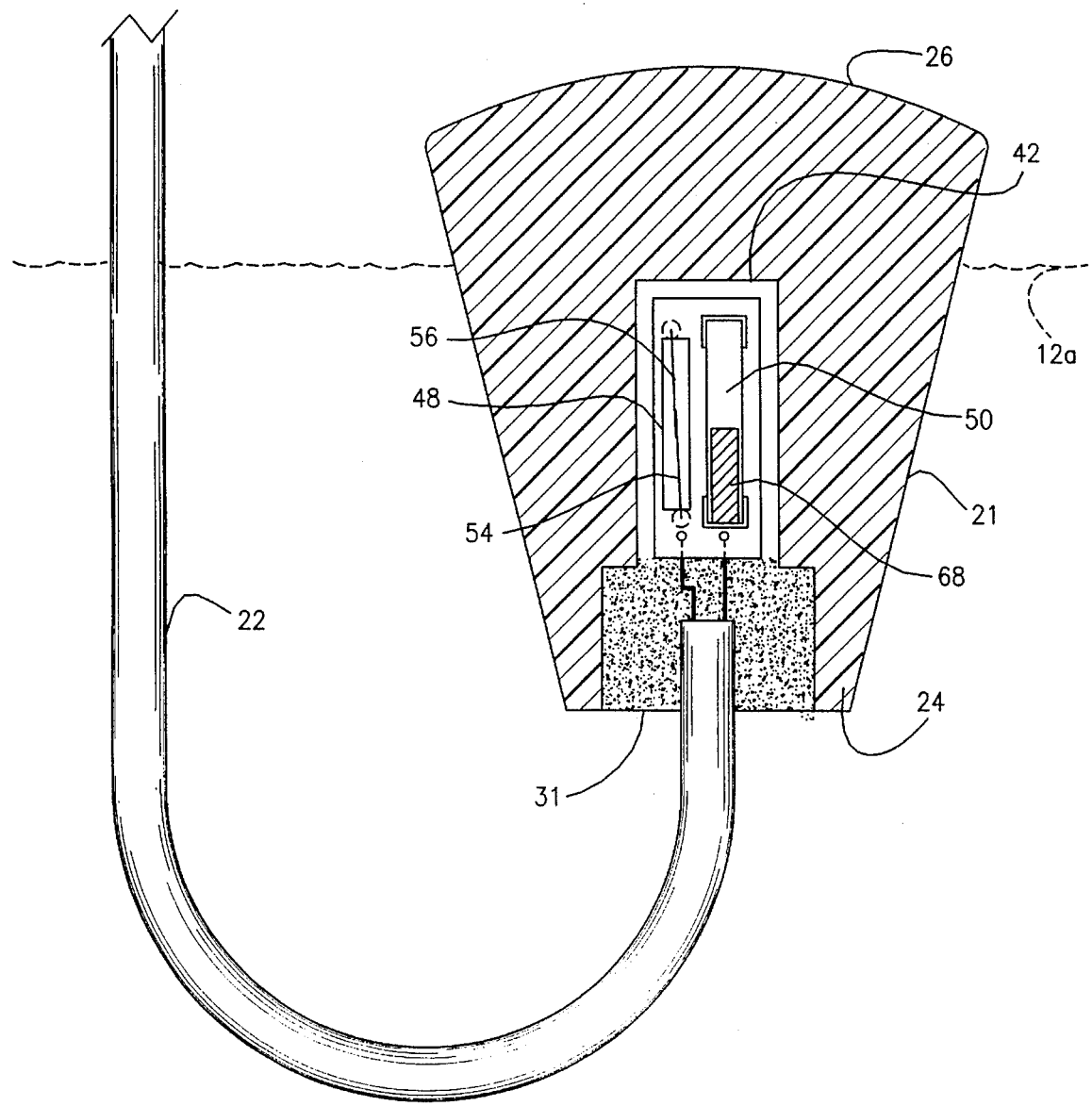
FIG. 5 is an elevational, cross sectional view similar to that of FIG. 2 of the float element after it has been tipped such that the magnet has shifted to the second position and the reed switch has closed.

A printed circuit board 42 is mounted within chamber 32. Board 42 is mounted within the chamber such that the board is permitted virtually no movement within the chamber. This may be accomplished by forming chamber 32 to be sufficiently small so that very little tolerance is provided between the board and the walls of the chamber. The spacing indicated in FIGS. 2 and 5 is exaggerated for illustrative purposes. Additionally, a suitable waterproof adhesive, not shown, may be employed to improve the attachment between printed circuit board 42 and the walls of chamber 32.

As best shown in FIG. 3, board 42 includes a forward side 43 that carries a reed switch 48 and a permanent magnet capsule 50. Switch 48 may comprise a commercially available reed switch, such as is manufactured by Hamlin. In particular, the reed switch includes an elongate transparent tube 52 that is composed of glass or a synthetic material. Tube 52 is securely mounted to board 42 by an appropriate adhesive or epoxy, which will be known to those skilled in the art. A pair of switch contacts 54 and 56 are operably mounted in tube 52, in a known manner. Contacts 54 and 56 are composed of a magnetically interactive material. In FIGS. 2 and 3 the contacts are normally open. In alternative embodiments of this invention, the contacts of the reed switch may be normally closed. An electrical lead 58 extends from contact 52 and through board 42, where it interconnects with printed circuit conductor 46. A second lead 60 extends from contact 56 and through board 42, where it interconnects printed circuit conductor 44.

Permanent magnet capsule 50 comprises an elongate, transparent glass or plastic tube 62. Upper and lower end caps 64 and 66 are fitted over the respective ends of tube 62. This seals the ends of the tube and forms stops for a permanent magnet 68 that is slidably mounted in tube 62. The width or diameter of magnet 68 is slightly less than the inner diameter of tube 62 such that the magnet freely slides between first and second positions that are defined by the end caps 64 and 66. As is best shown in FIG. 2, capsule 50 is mounted generally parallel and adjacent to reed switch 48 on side 43 of board 42. Again, a conventional epoxy or adhesive is used to fasten capsule to the printed circuit board.

Cable 22 extends into recess 30. As is also illustrated in FIG. 4, cable 22 carries a pair of electrical conductors 34 and 36 that electrically interconnect apparatus 20 with the pump 14 (FIG. 1). A PVC jacket 38 encloses the conductors and also encloses a plurality of flexible jute filler strands 40. This material insulates and protects the conductors and is non-wicking so that electrical shorting is avoided. Recess 30 is filled by weighted means 31. More particularly, the weight comprises a relatively dense, relatively massive material such as steel shot 33 that is embedded within a suitable epoxy 35. Weight 31 is significantly denser and more massive than the remaining buoyant material of float element 21. The lower end of cable 22 is embedded within epoxy 35 before the epoxy sets. As a result, float element 21 is mechanically secured to and suspended by cable 22. Filler strands 40 expand from the end of jacket 38 into epoxy 35 to provide even stronger attachment.

Cable 22 and, therefore, pump 14 are electrically connected to printed circuit board 42 in the following manner. As best shown in FIGS. 2 and 3, conductors 34 and 36 extend through epoxy 35 and are secured respectively to conductors 44 and 46 of printed circuit board 42. This attachment is made on the reverse side of board 42 in a manner known to those skilled in the art of printed circuit board electronics. As a result, an electrical circuit is provided through board 42. Specifically, conductors 34 and 44 are electrically connected to conductors 36 and 46 through reed switch 48. Operation of the reed switch, in the manner described below, causes the electrical circuit to be selectively opened and closed in order to operate pump 14.

Apparatus 20 is constructed by initially forming cavity 28 in the truncated end of float element 21. Printed circuit board 42, which carries magnet capsule 50 and reed switch 48, is then mounted within chamber 32 and, if necessary, an appropriate adhesive is applied to the printed circuit board. The conductors 34 and 36 of cable 22 may be operably connected to board 42 before the printed circuit board is introduced into chamber 32. Alternatively, conductors 34 and 36 may be attached, in the above described manner, after the board is mounted within the chamber. In either event, the lower end of cable 22 is introduced into recess 30 before the weighted material 31 is added to the recess. After the electrical connections are completed, epoxy 35 and embedded steel shot 33 are introduced into the recess and allowed to set. Electrical interconnection of cable 22 to a pump or other apparatus to be operated is thereby completed and the float switch is ready for use.

When liquid 11 is below a predetermined level in container 10 (e.g. at level 12), float element 21 hangs downwardly from cable 22, in the manner depicted in FIG. 1. Accordingly, capsule 50 and switch 48 maintain the generally vertical orientation shown in FIG. 2. Magnet 68 rests in a first position at the lower end of capsule 50. The position of magnet 68 is such that the magnetic field has little or no affect on contacts 54 and 56. As a result, the contacts remain separated and the electrical circuit remains open. Pump 14 does not operate and, as a result, liquid is not pumped from container 10. This is the desired result because the level 12 of liquid in the container is not excessive.

Over time, the level of liquid in the tank may rise. Eventually, liquid 11 reaches float element 21 and causes that element to similarly rise. At a predetermined level (e.g. level 12a), FIGS. 1 and 5, weight 31 causes float element 21 to tip or invert in the liquid. As a result, convex bottom surface 26 faces upwardly and truncated end 24 is directed downwardly. Float element 21 is thereby caused to float in the manner shown in FIG. 5 and in phantom in FIG. 1. Although the float element is shown floating at the surface it may alternatively exhibit a negative buoyancy and be suspended beneath the surface. The precise level is determined by adjusting the density of the float element and/or the mass of the epoxy and steel shot weight. In any event, when element 21 inverts, board 42, as well as reed switch 48 and magnet capsule 50 are likewise inverted. Permanent magnet 68 slides to the opposite end of capsule 50, defined by cap 64, and maintains a second position in the capsule. In this position the magnetic field produced by magnet 68 causes contacts 54 and 56 to close. As a result, switch 48 is closed and the electrical circuit is completed. Pump 14, FIG. 1, is activated to remove excessive liquid from container 10. The pumping operation continues until the liquid drops below the predetermined level at which the float element inverts. At that point, float element 21 is again suspended downwardly from cable 22. The permanent magnet shifts back to the position illustrated in FIG. 2, which causes contacts 54 and 56 of switch 48 to reopen. This opens the circuit and deactivates the pump.

It should be noted that a number of other switching variations may be accomplished within the scope of this invention. For example, reed switch 48 may be normally closed when the float element is suspended in the manner shown in FIG. 2 and inversion or tipping of the float element may cause magnet 68 to force open the contacts and break the circuit. This embodiment may be accomplished simply by moving capsule 50 vertically upwardly on the board 42, as referenced in FIGS. 2 and 3 such that the field magnet 68 closes contact 54 and 56 when the magnet is in the first position shown in FIGS. 2 and 3. Subsequently, when the float element inverts, magnet 68 shifts to the second position wherein its field does not affect the contacts and they therefore open. This embodiment is particularly effective for operating a pump to maintain a minimum liquid level in the container. In the suspended condition illustrated in FIG. 2, contacts 52 and 54 are closed by the magnet so that the pump is operated to add liquid to the container. If, however, the liquid level is sufficiently high so that the float element 21 inverts, this indicates that no additional liquid is needed. Therefore, the contacts remain open and the pump remains in an "off" condition.

Figure 6:
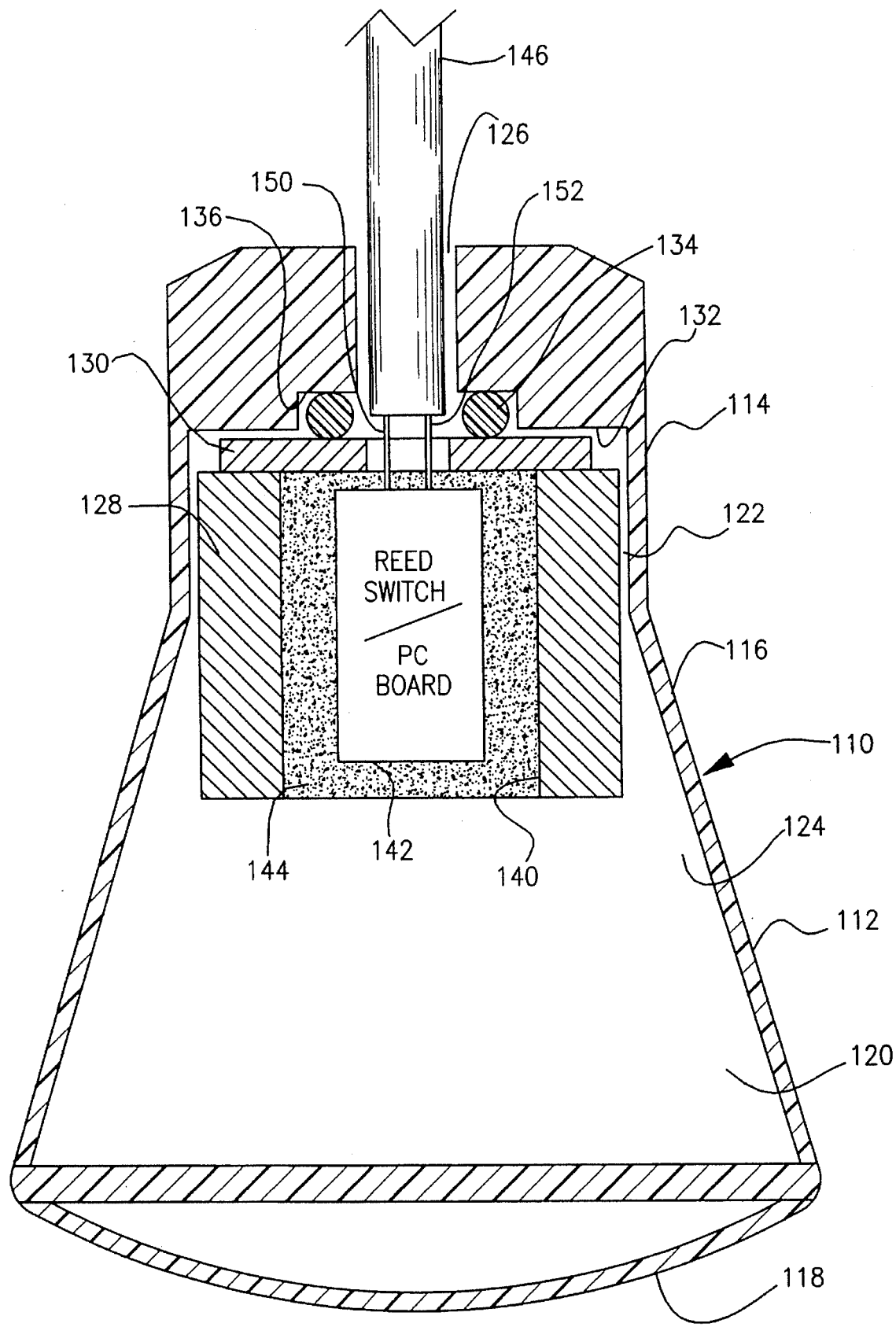
FIG. 6 is a cross sectional, partly schematic view of an alternative preferred float switch according to this invention.

There is shown in FIG. 6 an alternative preferred float switch apparatus 110. Again, the float switch apparatus employs a float element 112 having a generally conical shape and being composed of a buoyant material such as plastic. The float element includes an upper generally cylindrical section 114 and a lower section 116 that has a truncated, generally conical shape. Again, a generally convex lower surface 118 is utilized. The interior of the float element 112 is largely hollow and defines an interior chamber 120 having an upper cylindrical portion 122 and a lower conical portion 124. An opening 126 is formed through the upper end of float element 112 into upper chamber portion 122.

A cylindrical weight element 128 is mounted within chamber 120. In particular, element 128, which may be composed of cold rolled steel or similar material, is mounted in a close tolerance, e.g. interference, fit within chamber portion 122 such that the lower end of weight 128 extends downwardly into lower chamber portion 124. A flat washer 130 is interposed between the upper surface of weight 128 and the roof 132 of chamber 120. An O-ring 134 is disposed above washer 130 and is received in a recess 136.

Weight 128 includes an axial bore 140. A switching, assembly 142 is received within bore 140. The switching assembly comprises a reed switch, a permanent magnet and associated capsule, and a PC board as described in the previous embodiment. The individual elements of assembly 142 are constructed and operate analogously to the previous embodiment. Switching assembly 142 is encased within bore 140 by an appropriate waterproof epoxy 144.

A cable 146 carrying electrical conductors 150 and 152 is operably connected to an electrical circuit. The circuit includes a power source and a pump or other apparatus to be operated. These components have been described in the embodiments of FIGS. 1–5. Cable 146 and conductors 150 and 152 extend into float element 112 through opening 126. The conductors extend through the O-ring 134 and the washer 130 and are operably connected to switching assembly 142 in the manner previously described. As a result, assembly 142 acts to switch the electrical circuit "on" and "off" in response to appropriate movement of float element 112. For example, when the liquid level is below apparatus 110, the float element 112 is suspended in the manner shown in FIG. 6. As a result, the reed switch is either opened or closed so that the electrical circuit is maintained in either an "on" or "off" state. As the liquid level rises, it eventually engages float element 112 and exerts either a negative or positive buoyancy on the float element. Weight 128 causes float element 112 to invert so that the permanent magnet of switching assembly 142 is shifted in position, as previously described. This causes the reed switch to change from an opened to a closed state or vice versa so that the condition of the electrical circuit is switched. As a result, an alarm, indicator apparatus, pump, motor or other apparatus is activated or deactivated as necessary. It should be noted that the various alternative operations described for the previous embodiment apply equally to this second preferred embodiment.

The electrical circuit has been illustrated as operating, a pump. However, it should be noted that various other devices, including audio and visual alarms, may be operated equally effectively using, the float switch of this invention.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A magnetically activated float switch apparatus for opening and closing an electrical circuit in response to a predetermined change in the level of the liquid, said apparatus comprising:

a float element having an interior chamber;

a capsule mounted within said chamber;

an elongate, generally bar-shaped permanent magnet mounted in said capsule and being slidable between first and second positions therein;

switching means mounted in said chamber adjacent and parallel to said capsule and electrically connected to said electrical circuit, said switching means being responsive to said permanent magnet in said first position for maintaining a first state and responsive to said permanent magnet in said second position for maintaining an opposite second state, one of said states being open and the other being closed;

suspension means attached to said float element for holding said float element upright when the liquid is below a known level such that said magnet is in said first position and said switching means are in said first state; and weight means attached to said float element for causing said float element to tip in the liquid when the liquid is at or above the known level such that said magnet shifts from said first position to said second position and said switching means switch to said second state, said chamber including a cylindrical portion and an adjoining, generally conical portion and in which said weight means include a cylindrical element that is received in a close tolerance fit within said cylindrical portion of said chamber, said cylindrical element including an axial bore that receives said permanent magnet capsule and said switching means, said permanent magnet capsule and said switching means being encased in an epoxy-like substance.

2. The apparatus of claim 1 in which said float element has a truncated, generally conical shape.

3. The apparatus of claim 2 in which said chamber extends inwardly from the truncated end of said float element.

4. The apparatus of claim 1 in which said capsule includes a first elongate tubular element.

5. The apparatus of claim 1 in which said switching means include a reed switch arranged parallel to said capsule.

6. The apparatus of claim 4 in which said switching means are enclosed by a second elongate tubular element that is adjacent and generally parallel to said first tubular element.

7. The apparatus of claim 6 in which said tubular elements are mounted on a printed circuit board that defines a portion of the electrical circuit and includes circuitry that is electrically connected to said switching means.

8. The apparatus of claim 1 in which said suspension means include electrical cable means which carry at least a portion of said electrical circuit.

9. The apparatus of claim 8 in which said cable means comprise an outer cable jacket that is joined to said float element, electrical wiring that extends through said jacket and is connected to said switching means and filler means extending through said jacket and formed around said wiring.

10. The apparatus of claim 1 in which said float element includes a recess proximate an upper end of said float element for receiving said weight means.

11. The apparatus of claim 10 in which said suspension means convey at least part of said electrical circuit into said recess, said weight means including a weighted filler and a binding agent for encapsulating a lower end of said cable and said filler in said recess.

12. The apparatus of claim 11 in which said recess is adjacent to said chamber and said circuit extends into said chamber and is connected to said switching means.

13. The apparatus of claim 2 in which said float element includes a convex lower surface.

14. The apparatus of claim 10 in which said float element includes a truncated conical shape and said recess is formed in the truncated end of said float element.

15. The apparatus in claim 1 in which said weight means are attached directly to and are located at least partially within said float element.

16. A magnetically actuated float switch apparatus for opening and closing an electrical circuit in response to a predetermined change in the level of a liquid, said apparatus comprising:

a float element having an interior chamber;

a capsule mounted within said chamber;

an elongate, generally bar-shaped permanent magnet mounted in said capsule and being slidable between first and second positions therein;

switching means mounted in said chamber adjacent to said capsule and electrically connected to said electrical circuit, said switching means being responsive to said permanent magnet in said first position for maintaining a first state and responsive to said permanent magnet in said second position for maintaining an opposite second state, one of said states being open and the other being closed;

suspension means attached to said float element for holding said float element upright when the liquid is below a known level such that said magnet is in said first position and said switching means are in said first state; and weight means attached to said float element for causing said float element to tip in the liquid when the liquid is at or above the known level such that said magnet shifts from said first position to said second position and said switching means switch to said second state; said chamber including a cylindrical portion and an adjoining, generally conical portion and said weight means including a cylindrical element that is received in close tolerance fit within said cylindrical portion of said chamber.

17. The apparatus of claim 16 in which said cylindrical element includes an axial bore that receives said permanent magnet capsule and said switching means.

* * * * *